United States Patent [19]

Winter

[11] 4,237,762
[45] Dec. 9, 1980

[54] HAND HELD TOOL APPLIANCE

[76] Inventor: Kevin J. Winter, 15 Watson St., Oak Flats, New South Wales 2527, Australia

[21] Appl. No.: 939,739

[22] Filed: Sep. 5, 1978

[30] Foreign Application Priority Data

Sep. 6, 1977 [AU] Australia .............................. 1532/77
Oct. 10, 1977 [AU] Australia .............................. 1994/77

[51] Int. Cl.³ .......................... B27B 9/04; B27B 5/20; B27B 5/22
[52] U.S. Cl. ...................................... 83/745; 83/574; 83/488; 83/486.1
[58] Field of Search ................ 83/745, 574, 467, 488, 83/471.2, 471.3, 486.1

[56] References Cited

U.S. PATENT DOCUMENTS

| 2,656,860 | 10/1953 | Thayer | 83/471.3 |
| 2,739,624 | 3/1956 | Haddock | 83/486.1 |
| 2,765,820 | 10/1956 | Perkins | 83/574 |
| 2,803,271 | 8/1957 | Shaw | 83/574 |
| 3,212,540 | 10/1965 | Smith | 83/488 |
| 3,991,643 | 11/1976 | Girardin | 83/574 |

Primary Examiner—Donald R. Schran
Attorney, Agent, or Firm—Millen & White

[57] ABSTRACT

A guide for a hand held power saw comprises two extruded light alloy rails spaced apart by cross-pieces such that the spacing between rails may be adjusted to suit the saw to be used.

The guide may be applied directly to a sheet to be cut by the saw or spaced above a work table to enable timber to cut square or mitre cut to length.

3 Claims, 8 Drawing Figures

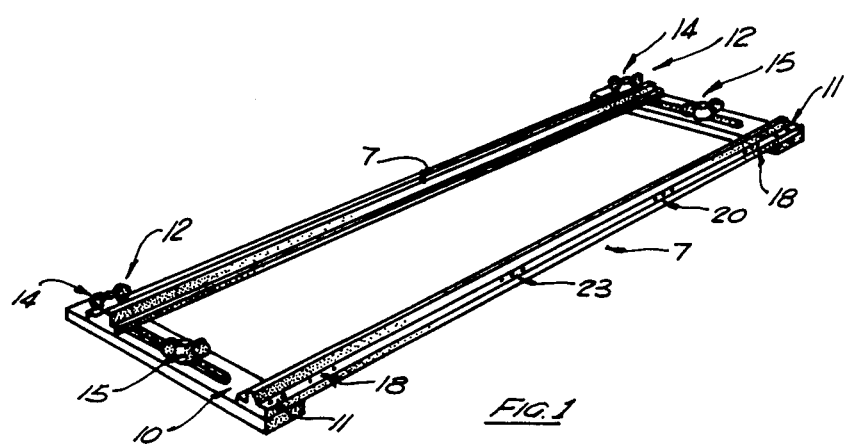
FIG. 1
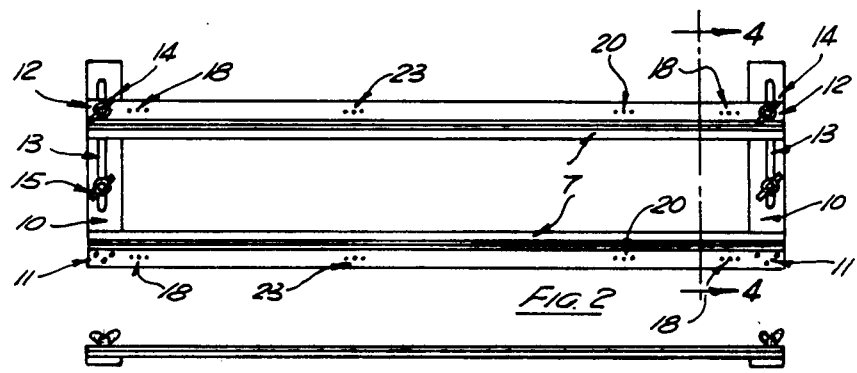
FIG. 2
FIG. 3
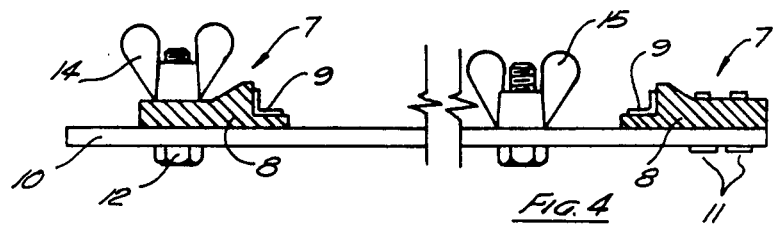
FIG. 4

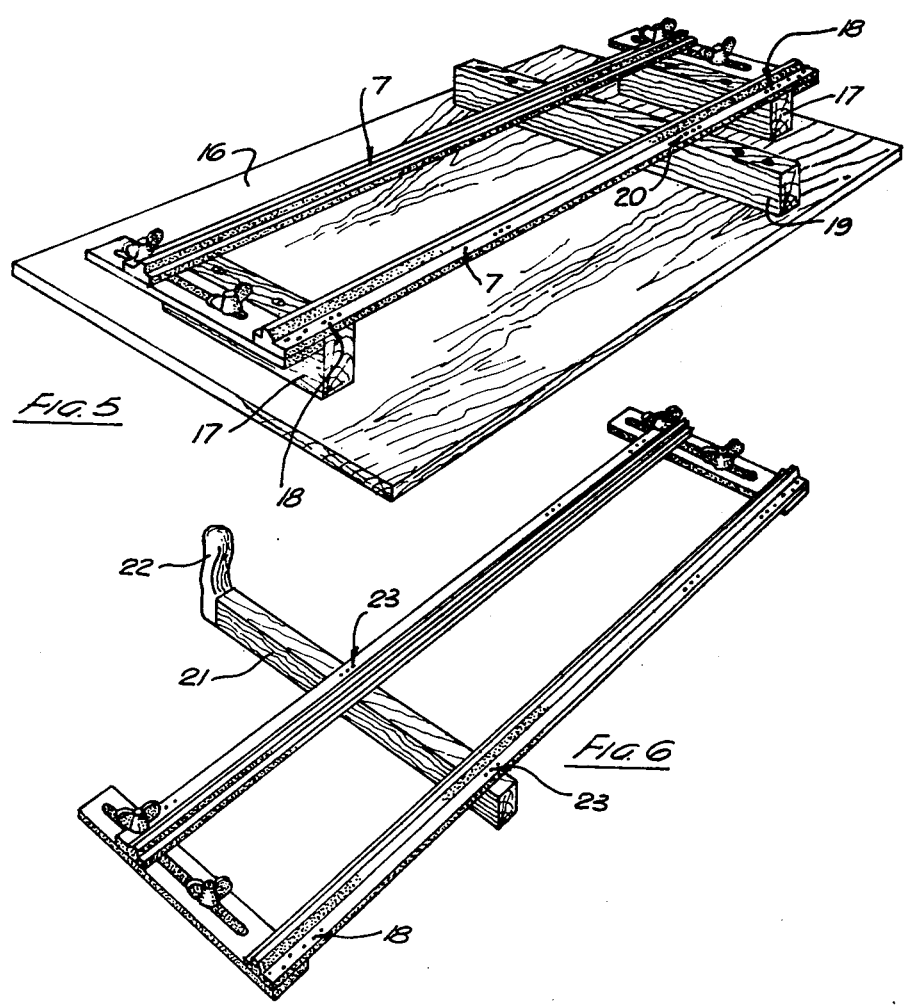

HAND HELD TOOL APPLIANCE

BACKGROUND OF INVENTION

This invention relates to an appliance to assist in the operation of a hand held, usually power-driven, tool, such as a hand held circular saw, router or the like. Hitherto there has been no convenient way of guiding the operation of such tools in the field away from the factory or work-bench situation.

FEATURES OR OBJECTS OF THE INVENTION

A common difficulty arising in the use of such tools is that of moving the tool along a straight accurately positioned line relative to the work so as to cut or otherwise operate on the work precisely where required, and an object of the present invention is to provide an appliance able to be applied easily to a workpiece which serves to guide the movement of the tool and enable an operator to shift it along a straight and accurately located travel path.

The invention consists in an appliance comprising two, straight, elongate spaced apart guide members adapted to function as a pair of guide rails for hand held tools and two cross pieces extending transversely of said guide members holding them in fixed relationship.

For preference the cross-pieces are disposed at or near the respective ends of the guide members and the connection between the cross-pieces and one of the guide members is such that the spacing between the guide members may be varied to suit the particular tool being used.

By way of example, several embodiments of the invention are described hereinafter with reference to the accompanying drawings.

BRIEF DESCRIPTION OF THE DRAWINGS

FIG. 1 is a perspective view of an appliance in accordance with the invention.

FIG. 2 is a plan view of the appliance of FIG. 1.

FIG. 3 is a side elevation of the appliance of FIG. 1.

FIG. 4 is a sectional view taken on line 4—4 of FIG. 2 and drawn to a larger scale.

FIG. 5 is a perspective view of a work station including the appliance of FIG. 1.

FIG. 6 is a perspective view of another embodiment of the invention.

DETAILED DESCRIPTION

Figure 7:
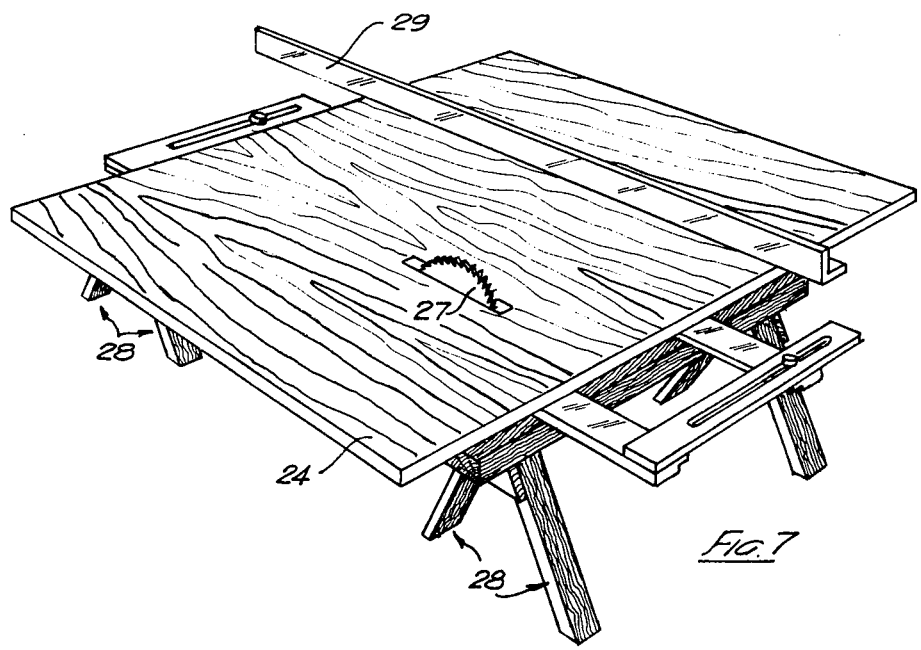
FIG. 7 is a perspective view of another embodiment of the invention.

The appliance illustrated by FIGS. 1 to 4 comprises two straight, elongate, spaced apart guide members 7. As can be seen in FIG. 4, each guide member 7 comprises a length of a metallic extrusion 8 supporting an extruded nylon or other plastics runner strip 9. Each runner strip 9 includes a horizontal flange upon which the base plate of a hand held circular saw or the like may rest and a vertical flange against which the edge of the base plate may slide so as to ensure that the tool is guided along a straight line path along the length of the appliance when it is located thereon. To that end the spacing between the guide members 7 is such that the base plate of the tool is a neat sliding fit between the runner strips 9.

The guide members 7 are spaced apart by two cross-pieces 10. One of the guide members 7 is permanently and rigidly fixed to the cross-pieces 10 by means for example of rivets 11, whereas, for preference, the other guide member 7 is adjustably or detachably secured to the cross-pieces 10 by means of clamping bolts 12 extending through bolt clearance holes in that guide member and through elongated apertures 13 in the cross-pieces 10 to facilitate positional adjustment by hand of the movable cross member 7. The clamping bolts 12 are furnished with wing-nuts 14 able to be tightened or loosened without need of a spanner.

If desired the cross pieces 10 may be calibrated in centimeters or other units of length so that the spacing between the guide members 7 at one end of the appliance may be readily made equal to the spacing at the other end thereby to ensure that the guide members are parallel as needed in any particular adjusted position.

The cross-pieces 10 are secured by the rivets 11 to the fixed guide member 7 in such a way as to meet substantially at right angles so that the external edges of the appliance are substantially square and true, enabling it to be used as a simple straight edge or square as well as a guide for a hand held tool.

If desired a level bubble or the like may be applied to one or other guide member and/or to one or other cross-piece to enable the appliance also to function as a carpenter's level.

Removable stops in the form of bolts and wing-nuts 15 may be furnished to prevent the hand held tool from being slid beyond the ends of the guide member 7 or to position where the tool's cutting element would contact the cross-pieces 10.

Turning now to FIG. 5, there is seen an appliance as described above with reference to FIGS. 1 to 4 set up in one form of work station for use in of cutting bars or planks of timber to length. The appliance is supported above a base board 16, which may be a bench top if so desired, by two riser blocks 17 secured to the base board 16 and to which the appliance is secured by means of screws or nails extending through clearance holes 18 provided in the guide members 7 for that purpose.

A stop bar 19 is also secured to the guide members 7, by way of screws or nails extending through further clearance holes 20 provided therein. The stop bar 19 is perpendicular to the longitudinal direction of the guide members 7. The work station of FIG. 5 may be used to cut timber to length by sliding the work piece underneath the guide members 7 and positioning it against the stop bar 19. A hand held saw may then be slid along the guide members 7 to cut through the work piece to produce a square end thereon.

In other work stations, if desired further stop bars may be furnished at an angle to the longitudinal direction of say 45° to enable mitered ends to be cut on the work piece.

The embodiment of the invention illustrated in FIG. 6 comprises the appliance of FIG. 1 in combination with a cross-bar 21 and a handle 22. The cross-bar 21 is perpendicular to the longitudinal direction of the appliance guide members and is secured in place by means of nails or screws extending through still further clearance holes 23 provided in the guide members for that purpose. This embodiment of the invention may be utilized for cutting square pieces from building boards such as chip boards or the like. To that end the appliance may be placed directly on the building board with the member 21 lying against a straight first edge thereof, following which a saw may be slid along the appliance guide to cut a further edge perpendicular to said first edge.

Figure 8:
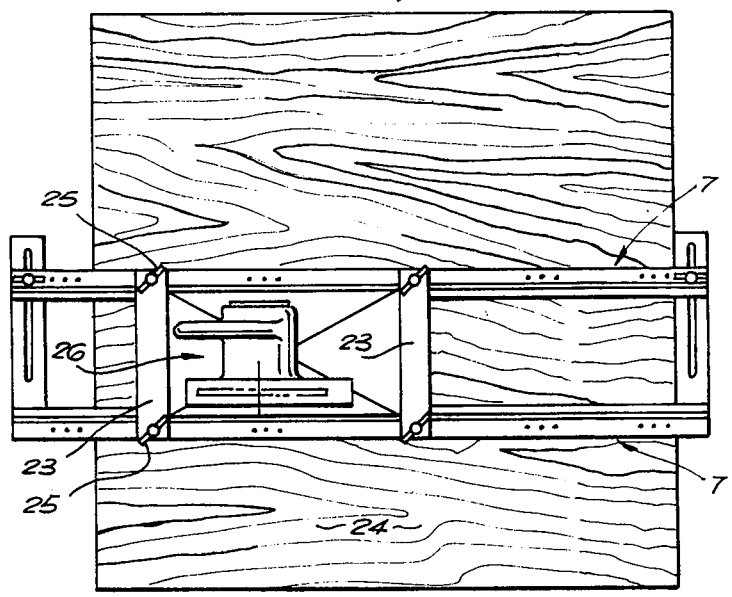
FIG. 8 is the view of the FIG. 7 embodiment seen from below.

The embodiment of the invention illustrated in FIGS. 7 and 8 comprises the appliance of FIG. 1 in combination with two clamping pieces 23 and a saw bench top 24.

The clamping pieces 23 are secured by clamping bolts 25 extending through holes in the guide members 7 and serve to fix in place a portable power saw 26 (or other appropriate tool) such that the saw blade 27 (or other cutting element) projects below what is normally the under side of the appliance when in use in other situation as described hereinbefore.

The appliance may then be inverted and secured to the under side of the top 24 by way of screws or the like extending through appropriate ones of the screw clearance holes in the guide members 7 so that the saw blade 27 (or other cutting element) extends upwardly through a slot in the table top 24.

The entire arrangement may then be arrested upon any available suitable support, such as two carpenter's saw horses 28, so that the appliance may then function in the manner of a fixed bench circular saw or other similar fixed bench wood working tool depending upon the nature of the portable tool clamped to the appliance.

For preference a guide 29 is secured to the bench top 24 at a suitable distance from the saw blade 27 to act as a guide for a sheet or the like being sawn.

From the foregoing it will be seen that notwithstanding its simplicity the appliance of the invention is a very practical tool which enables other tools to be used more expeditiously.

One way of achieving the necessary straightness and low cost of the appliance is to utilize light alloy extrusions for its parts.

I claim:

1. A light weight milti-purpose portable appliance adapted to guide a hand held tool when slidably positioned therein along a straight line path, consisting essentially of a pair of rigid metallic straight elongate spaced apart guide members, each with a mirror image, substantially right angled inner channel, adapted to function as a pair of guide rails for the frame structure of a hand held tool and each guide member having an outer longitudinal flange; an elongate plastic, running strip affixed along the channel of each guide member along the length thereof forming a contacting surface along which the frame structure of the hand held tool slides when positioned in the appliance; a pair of cross members extending transversely of and positioned below and proximate the respective ends of the guide rails, each cross member having a longitudinal slot extending beneath one guide member and extending a substantial distance therealong toward the opposite guide member, an upwardly projecting stop member in the form of an adjustable fastener mounted in each slot between the guide members and selectively fixable in each said slot to limit the movement of the frame structure of the hand held tool in the appliance beyond the end of the cross members and selectively prevent the hand held tool from contacting the cross member, the said opposite guide member being mounted in a nonadjustable manner to the cross members and a pair of wing nuts mounted on bolts each projecting through said slot in each cross member and the said outer longitudinal flange in the said one guide member, to thereby permit rapid manual adjustment of the position where the adjustably mounted guide rail is mounted on the cross members toward or away from the other guide member; each guide member being provided with mounting holes along the length of each outer flange of the guide members to permit temporary mounting of the appliance to an appurtenent structure.

2. An appliance according to claim 1 wherein each guide member has at least one set of clearance holes intermediate the ends of the outer flanges of each guide member, and wherein there is provided a transverse stop member secured to the guide members by fasteners through said set of clearance holes.

3. An appliance according to claim 1 having a cross bar secured to its underside intermediate its ends with an upright handle thereon spaced to one side of the appliance guide members.

* * * * *